E. W. TUCKER.

Bed-Bottom.

No. 6,338. Reissued March 16, 1875.

Attest:
R. S. Dyer
Charles Thurman

Inventor:
Erwin W. Tucker
by Geo. W. Dyer & Co

THE NORRIS PETERS CO., PHOTO-LITHO., WASHINGTON, D. C.

UNITED STATES PATENT OFFICE.

ERWIN W. TUCKER, OF INDIANAPOLIS, INDIANA, ASSIGNOR, BY MESNE ASSIGNMENTS, TO CHARLES H. DUNKS, OF NEW YORK CITY.

IMPROVEMENT IN BED-BOTTOMS.

Specification forming part of Letters Patent No. 53,706, dated April 3, 1866; reissue No. 6,338, dated March 16, 1875; application filed December 23, 1874.

*To all whom it may concern:*

Be it known that I, ERWIN W. TUCKER, of the city of Indianapolis, county of Marion and State of Indiana, have invented certain new and useful Improvements in Bed-Bottoms; and do hereby declare that the following is a full, clear, and exact description of the same, reference being had to the accompanying drawings, and the letters of reference marked thereon, in which—

Figure 1:
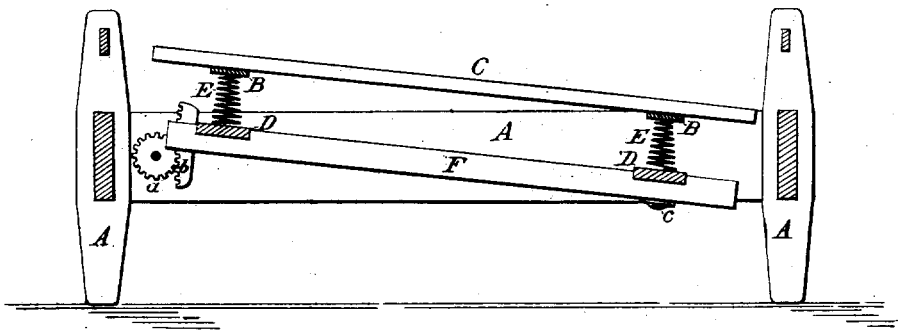
Figure 2:
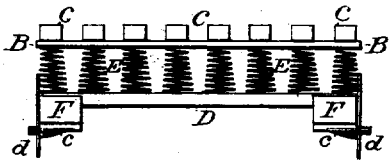
Figure 3:
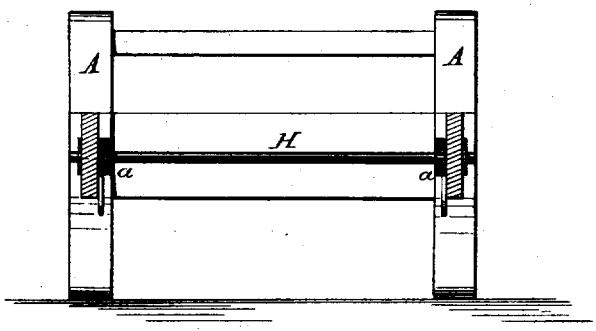
Figure 4:
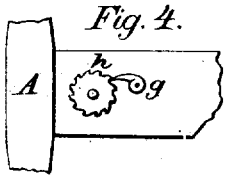

Figure 1 represents a longitudinal section with the bed-bottom in place; Fig. 2, an end view of the foot of the bed-bottom; Fig. 3, a section of the bedstead, showing the elevating device; and Fig. 4, a view of the dog and ratchet.

Like letters represent corresponding parts in each figure.

In the drawings, A represents the bedstead, which is made in any of the ordinary forms. Within the bedstead is placed the bed-bottom, which is constructed of two side pieces, F, and two cross-pieces, D, which are attached to and connect the side pieces F. Upon the cross-pieces D are a series of spiral springs, E. Directly upon the spiral springs E are metallic springs, at or near the ends of the bed-bottom, which extend from one side of the bed-bottom to the other, as seen at B B, and hold the spiral springs E in their proper places, and this metallic spring is free at each end, in contradistinction to having ends secured to the side rails. C represents a series of slats running lengthwise with the bed, and secured upon the metallic springs B, which form the top of the bed-bottom. H represents a horizontal metallic bar, which is placed at the head of the bedstead. At the outside of this bar are a dog and ratchet, *h* and *g*, which are secured to the outer sides of the bedstead. At the inner side of the bedstead, and encircling the bar H, are cogs *a a*. *b b* represent rack-bars, which have teeth, and mesh into the cogs *a a*. One rack-bar is attached to each side of the bed-bottom at the head. Near the foot of the bed-bottom is a small bar, *c*, which is secured to the bedstead by means of a bracket, *d*, said bracket extending a short distance beneath the side pieces of the bedstead.

It will be seen that this bed-bottom, being adjustable by means of the bar H, with the cogs *a a* and rack-bars *b b*, can be elevated or lowered at the head to suit the dog and ratchet at the outer side, securing the same in the required position. The metallic springs B, extending across the bed-bottom, not only support the spiral springs E, but combine them, and hold the same to their proper places; at the same time the pressure is divided between the springs.

Having thus fully described my invention, what I claim as new and my own invention, and desire to secure by Letters Patent, is—

1. In a bed-bottom, the combination of an elastic metallic spring, with free ends extending across the bed-bottom, a series of spiral springs secured at their upper ends to said metallic spring, and a rigid cross-bar, to which the lower ends of the spiral springs are secured, substantially as described.

2. The combination of the bedstead A, having bar H and cogs *a a*, with the bed-bottom, having bars F and rack-bars *b b*, as and for the purpose set forth.

3. The bars D and bars F, with springs E, in combination with the springs B and rails C, arranged substantially as and for the purposes herein set forth.

ERWIN W. TUCKER.

Witnesses:
S. G. FRINK,
E. O. FRINK.